United States Patent
Cao

(10) Patent No.: US 9,444,982 B2
(45) Date of Patent: Sep. 13, 2016

(54) SURVEILLANCE CAMERA AND THE HOUSING THEREOF

(71) Applicant: SONY CORPORATION, Minato-Ku (JP)

(72) Inventor: Zhengshan Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 302 days.

(21) Appl. No.: 14/290,033

(22) Filed: May 29, 2014

(65) Prior Publication Data

US 2014/0362224 A1    Dec. 11, 2014

(30) Foreign Application Priority Data

Jun. 7, 2013    (CN) .......................... 2013 1 0227484

(51) Int. Cl.
*H04N 7/00* (2011.01)
*H04N 5/225* (2006.01)
*G08B 13/196* (2006.01)

(52) U.S. Cl.
CPC ...... *H04N 5/2252* (2013.01); *G08B 13/19619* (2013.01)

(58) Field of Classification Search
CPC ................. G08B 13/19619; H04N 5/2252
USPC ....................................................... 348/151
See application file for complete search history.

(56) References Cited

U.S. PATENT DOCUMENTS

| | | | | |
|---|---|---|---|---|
| 3,879,742 A | * | 4/1975 | Smith | G03B 17/08 348/143 |
| 4,736,218 A | * | 4/1988 | Kutman | F16M 11/18 348/143 |
| 5,426,476 A | * | 6/1995 | Fussell | B64D 47/08 348/E5.026 |
| 2008/0159734 A1 | * | 7/2008 | Westerweck | G03B 17/02 396/541 |
| 2011/0154773 A1 | * | 6/2011 | Arnold | G08B 13/19632 52/745.21 |
| 2011/0221908 A1 | * | 9/2011 | Hoelter | B29C 43/36 348/164 |
| 2012/0154521 A1 | * | 6/2012 | Townsend | H04N 5/247 348/36 |

* cited by examiner

*Primary Examiner* — Anner Holder

(74) *Attorney, Agent, or Firm* — Oblon, McClelland, Maier & Neustadt, L.L.P.

(57) ABSTRACT

The present invention discloses a surveillance camera, which comprises: a housing for accommodating substrate and internal components; the housing includes a base and an upper cover, the base is provided with a retaining ring at the periphery of its bottom and a plurality of bolt holes at its periphery in the circumferential direction, and the base is fixed firmly to the upper cover by bolts to form a cavity; for each of the bolt holes there is provided a guiding groove at its bottom end; each of the bolt holes is provided at one side with a gutter, which is connected with the guiding groove; the upper cover is also provided with gutter; the base is provided at its bottom with a mounting hole for installing a dehumidifying means, and at the periphery of the mounting hole there is a retainer, at the outer edge of which there is provided a guiding gutter, which is connected with the gutter of the base. The present invention enables water to be discharged from the housing via the gutter; even if some water enters the housing, it is difficult for water to enter the surveillance camera via the bolt hole. The present invention also discloses a housing of the surveillance camera.

10 Claims, 3 Drawing Sheets

SURVEILLANCE CAMERA AND THE HOUSING THEREOF

FIELD OF THE INVENTION

The present invention relates to a surveillance camera. And the present invention also relates to a housing of the surveillance camera.

BACKGROUND OF THE INVENTION

A surveillance camera placed outdoor is required to work outdoor over a long period of time, and is thus inevitably exposed to rain. For an existing surveillance camera, its housing for accommodating a substrate and other internal components includes a base 1 and an upper cover as shown in FIG. 1, the base 1 is provided with a retaining ring 11 at the periphery of its bottom and a plurality of bolt holes 12 for bolts to go through on its periphery in the circumferential direction, the base 1 is fixed firmly to the upper cover by bolts to form a cavity; a mounting hole 13 is provided on the bottom of the base 1 for installing a dehumidifying means. For facilitating installation and removal, the bolt hole 12 in the base 1 goes throughout the base 1 from top to bottom; When the surveillance camera is under installation, the bolt is made to go throughout the bolt hole 12 from the bottom of the base 1 and connected with the upper cover.

With a surveillance camera of this structure in operation, since the bottom face of the base 1 faces upward, rainwater will accumulate at the bottom of the base 1; when water reaches a certain amount, it may flow from the bottom end of the bolt hole 12 (the bottom end of the bolt hole 12 faces upward while being used) into the housing of the surveillance camera along the bolt hole 12, thus causing fog, dew, etc. inside the surveillance camera, furthermore this may even cause corrosion of the internal substrate in severe cases, which eventually causes the surveillance camera to lose monitoring function.

Besides, when there is fog and dew inside the surveillance camera, the normal use of the dehumidifying means will also be affected.

CONTENTS OF THE INVENTION

A purpose of the present invention is to provide a surveillance camera, which can work normally outdoor over a long period of time.

In order to solve the above technical problem, the following technical solution is used for the surveillance camera of the present invention:

A surveillance camera comprises: a housing for accommodating a substrate and internal components; the housing includes a base and an upper cover, the base is provided with a retaining ring at the periphery of its bottom and a plurality of bolt holes for bolts to go through at its periphery in the circumferential direction, the base is fixed firmly to the upper cover by bolts to form a cavity; for each of the bolt holes there is provided a guiding groove at its bottom end, and the bolt hole is located at the bottom of the guiding groove; a gutter is provided on one side of the bolt hole, the gutter goes throughout the base from top to bottom; the gutter of the base is connected to the guiding groove; the upper cover is provided with the gutter, which goes throughout the upper cover from top to bottom; the gutter of the upper cover is connected with the gutter of the base; a mounting hole for installing a dehumidifying means is provided at the bottom of the base, and the mounting hole is provided at its periphery with a retainer, which is provided at its outer edge with a guiding gutter which is connected with the gutter of the base.

The guide groove has a larger area than the bolt hole.

The guiding gutter of the upper cover is located at one side of the bolt hole of the upper cover, and is connected with the bolt hole of the upper cover.

The guiding gutter of the base is connected with the bolt hole of the base; the width of the gutter is smaller than the diameter of the bolt hole.

The base is provided on its top surface to which the upper cover is connected with a seal retainer, and the bolt hole of the base is located at the outside of the seal retainer.

The present invention also provides a housing of the surveillance camera, which has the following technical solution:

The housing comprises a base and an upper cover, the base is provided with a retaining ring at the periphery of its bottom and a plurality of bolt holes for bolts to go through the base at its periphery in the circumferential direction, the base is fixed firmly to the upper cover by bolts to form a cavity; each of the bolt holes is provided at its bottom end with a guiding groove, at the bottom of which is located the bolt hole; the bolt hole is provided at one side with a gutter, which goes throughout the base from top to bottom; the gutter of the base is connected with the guiding groove; the upper cover is provided with the gutter, which goes throughout the upper cover from top to bottom; the gutter of the upper cover is connected with the gutter of the base; the base is provided at its bottom with a mounting hole for installing a dehumidifying means, and the mounting hole is provided at its periphery with a retainer, which is provided at its outer edge with a guiding gutter that is connected with the gutter of the base.

cross-sectional area of the guiding groove is larger than the one of the bolt hole.

The gutter of the upper cover is located at one side of the bolt hole of the upper cover, and is connected with the bolt hole of the upper cover.

The gutter of the base is connected with the bolt hole of the base; the width of the gutter is shorter than the diameter of the bolt hole.

on the connection surface of top surface of the base and the upper cover, there is provided a seal retainer, with the bolt hole of the base located at the outside of the seal retainer.

The present invention can achieve the following technical effects:

The present invention enables water to be discharged from the housing via the gutter; even if some water enters the housing, it is difficult to enter the surveillance camera via the bolt hole.

The present invention can solve the waterproof problem in a limited space.

BRIEF DESCRIPTIONS OF THE DRAWINGS

The present invention will be further described below in detail with reference to drawings and embodiments.

Figure 1:
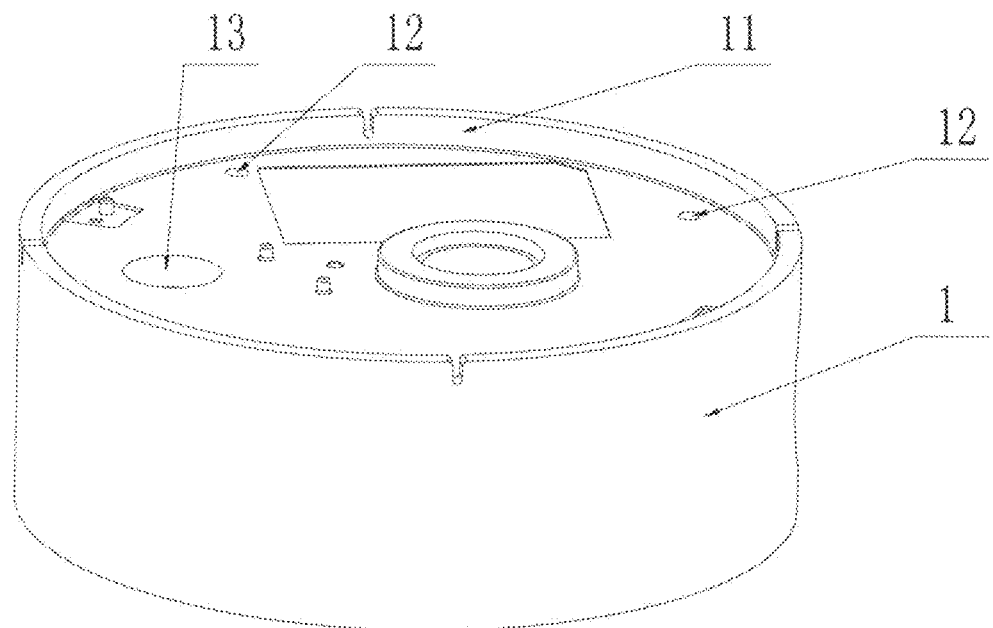
FIG. 1 is a schematic view of the base of an outdoor surveillance camera of the prior art with the bottom face facing upward.

DESCRIPTION OF REFERENCE SIGN IN THE FIGURES 1. base; 2. upper cover;
3. seal retainer;
11. retaining ring; 12. bolt hole of the base;
13. mounting hole;
121. guiding groove; 122. gutter of the base;
21. gutter of the upper cover; 22. bolt hole of the upper cover;
131. retainer; and 132. guiding gutter.

DETAILED DESCRIPTION OF THE EMBODIMENTS

Figure 2:
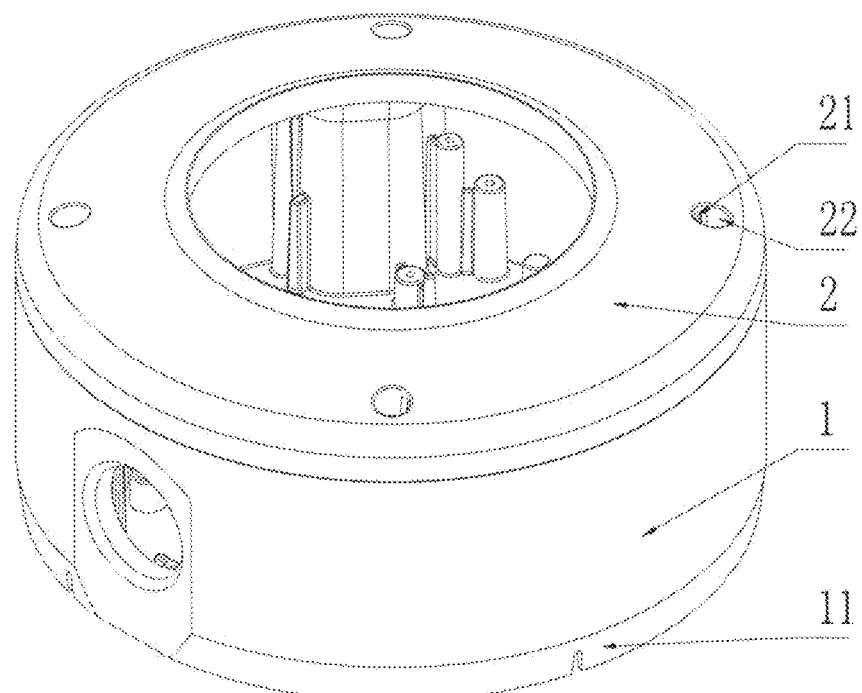
FIG. 2 is a schematic view of the housing of the surveillance camera of the present invention.
Figure 3:
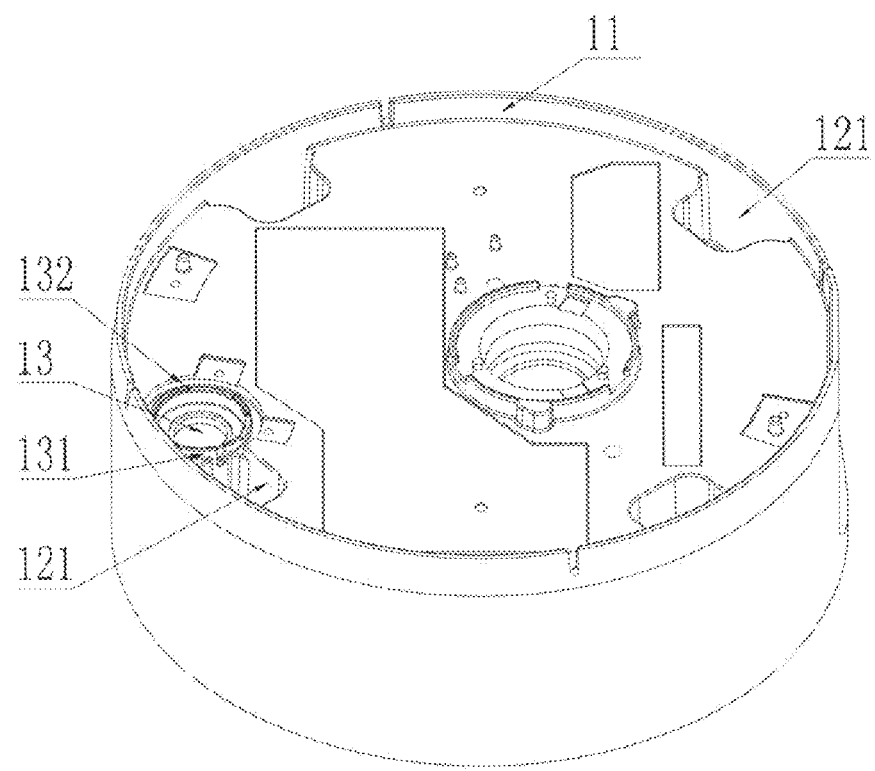
FIG. 3 is a schematic view of the base of the present invention with the bottom face facing upward.
Figure 4:
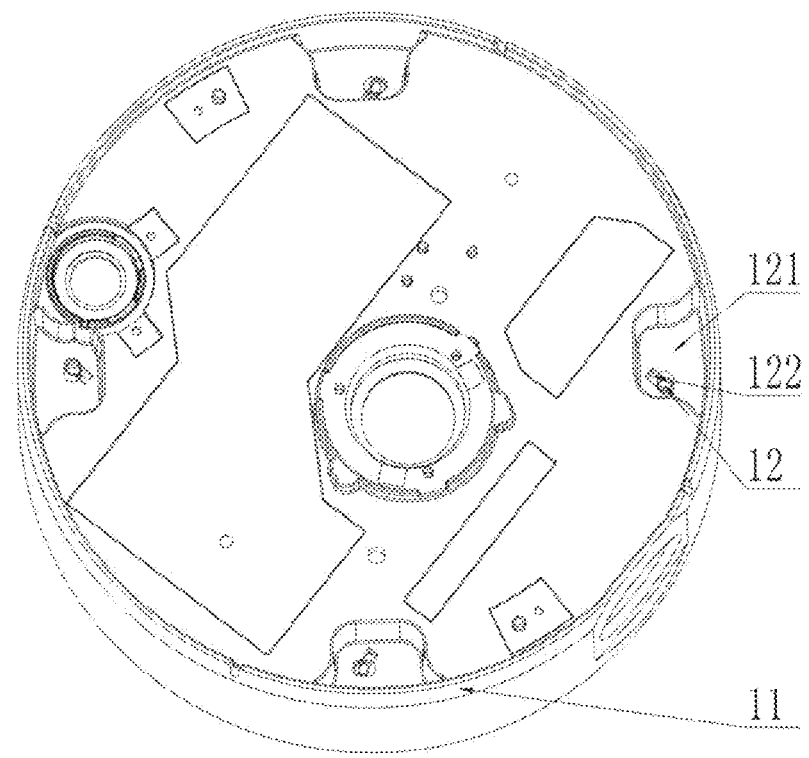
FIG. 4 is a schematic view of the base of the present invention with the bottom face facing upward in another perspective.
Figure 5:
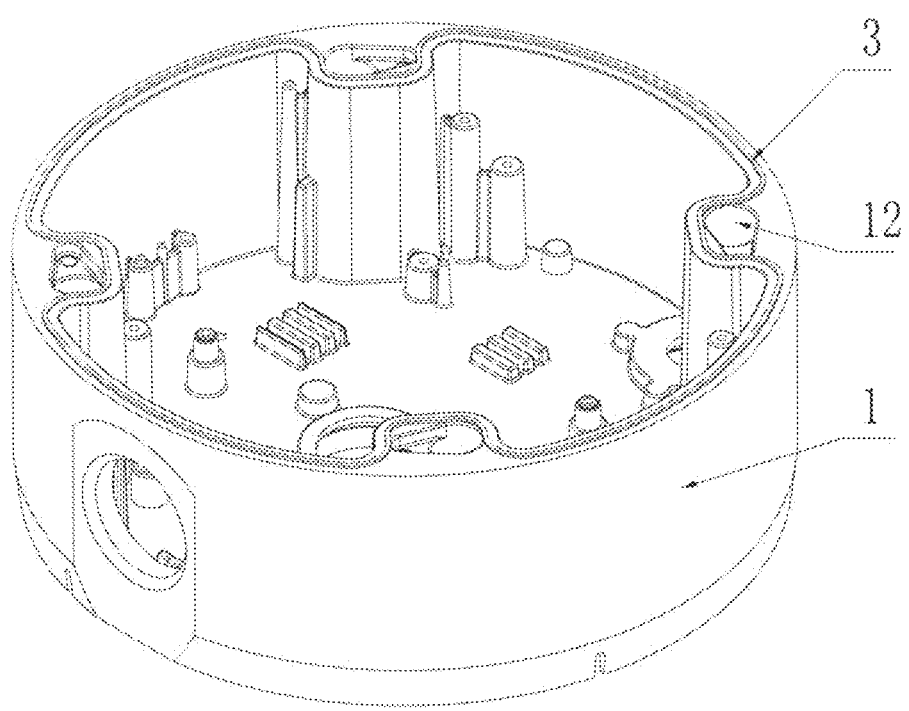
FIG. 5 is a schematic view of the base of the present invention with the top face facing upward.

The surveillance camera of the present invention comprises the following parts as shown in FIGS. 2 and 4: a housing for accommodating a substrate and internal components; the housing includes a base 1 and an upper cover 2, the base 1 being provided with a retaining ring 11 at the periphery of its bottom and a plurality of bolt holes 12 for bolts to go through at its periphery in the circumferential direction, the bolt hole 12 going throughout the base 1 from top to bottom, the base 1 being fixed firmly to the upper cover 2 by bolts to form a cavity;

as shown in FIG. 3, each bolt hole 12 is provided at its bottom end with a guiding groove 121, cross-sectional area of which is larger than the one of the bolt hole 12, making the bolt hole 12 located at the bottom of the guiding groove 121; since the bottom face of the guiding groove 2 is lower than that of the base 1, the guide groove 121 can accumulate rainwater, and thus holding rainwater at the bottom of the base to the inside of the guide groove 2;

as shown in FIG. 4, each bolt hole 12 is provided at one side with a gutter 122, which goes throughout the base 1 from top to bottom; the gutter 122 of the base 1 is connected with the guiding groove 121;

the upper cover 2 is also provided at the corresponding position with the gutter 21, with the gutter 21 of the upper cover 2 located at one side of the bolt hole 22 of the upper cover 2 and is connected with the bolt hole 22 of the upper cover 2; the gutter 21 of the upper cover 2 goes throughout the upper cover 2 from top to bottom; the rainwater being held in the guide groove 121 is discharged out of the housing from the gutter 21 of the upper cover 2 via the gutter 122 of the base 1, and thus the rainwater will not enter the inner cavity of the surveillance camera due to rain water accumulation, thereby achieving waterproof effect and preventing water from being accumulated at the bottom of the base 1;

the gutter 122 is connected with the bolt hole 12, and the width of the gutter is shorter than the diameter of the bolt hole 12;

the base 1 is provided at its bottom with a mounting hole 13 for installing a dehumidifying means, and the mounting hole 13 is provided at its periphery with a retainer 131, which is provided at its outer edge with a guiding gutter 132 which is connected with the gutter 122 of the base 1; the guiding gutter 132 is used for accumulating rainwater, and discharging the rainwater out of the inner cavity of the housing from the gutter 21 of the upper cover 2 via the gutter 122 of the base 1; the retainer 131 is used for preventing rainwater from entering the dehumidifying means via the mounting hole 13;

as shown in FIG. 5, the base 1 is provided on its top face to which the upper cover 2 is connected with a seal retainer 3, with the bolt hole 12 located outside the seal retainer 3; the seal retainer 3 isolates the inner cavity of the housing from the bolt hole 12, thus preventing the water accumulated in the bolt hole 12 from entering the surveillance camera.

What is claimed is:

1. A surveillance camera, characterized in that: the surveillance camera comprising: a housing for accommodating a substrate and internal components; the housing includes a base and an upper cover, the base is provided with a retaining ring at the periphery of its bottom and a plurality of bolt holes for bolts to go through at its periphery in a circumferential direction, the base is fixed firmly to the upper cover by bolts to form a cavity;

the bolt hole is provided at its bottom end with a guiding groove, at the bottom of which locates the bolt hole;

the bolt hole is provided at one side with a gutter, which goes throughout the base from top to bottom; the gutter of the base is connected with the guiding groove;

the upper cover is provided with the gutter, which goes throughout the upper cover from top to bottom; the gutter of the upper cover is connected with the gutter of the base; and the base is provided at its bottom with a mounting hole for installing a dehumidifying means, and the mounting hole is provided at its periphery with a retainer, which is provided at its outer edge with a guiding gutter which is connected with the gutter of the base.

2. The surveillance camera according to claim 1, characterized in that: cross-sectional area of the guiding groove is larger area than the one of the bolt hole.

3. The surveillance camera according to claim 1, characterized in that: the gutter of the upper cover is located at one side of the bolt hole of the upper cover, and is connected with the bolt hole of the upper cover.

4. The surveillance camera according to claim 1, characterized in that: the gutter of the base is connected with the bolt hole of the base; the width of the gutter is shorter than the diameter of the bolt hole.

5. The surveillance camera according to claim 1, characterized in that: on the connection surface of top surface of the base and the upper cover, there is provided a seal retainer, and the bolt hole of the base is located at the outside of the seal retainer.

6. A housing of surveillance camera, characterized in that: the housing comprises a base and an upper cover, the base is provided with a retaining ring at the periphery of its bottom and a plurality of bolt holes for bolts to go through at its periphery in the circumferential direction, the base is fixed firmly to the upper cover by bolts to form a cavity;

the bolt hole is provided at its bottom end with a guiding groove, at the bottom of which locates the bolt hole;

the bolt hole is provided at one side with a gutter, which goes throughout the base from top to bottom; the gutter of the base is connected with the guiding groove;

the upper cover is provided with the gutter, which goes throughout the upper cover from top to bottom; the gutter of the upper cover is connected with the gutter of the base; and the base is provided at its bottom with a mounting hole for installing a dehumidifying means, and the mounting hole is provided at its periphery with a retainer, which is provided at its outer edge with a guiding gutter which is connected to the gutter of the base.

7. The housing of the surveillance camera according to claim 6, characterized in that: cross-sectional area of the guiding groove is larger than the one of the bolt hole.

8. The housing of the surveillance camera according to claim 6, characterized in that: the gutter of the upper cover is located at one side of the bolt hole of the upper cover, and is connected with the bolt hole of the upper cover.

9. The housing of the surveillance camera according to claim 6, characterized in that: the gutter of the base is connected with the bolt hole of the base; the width of the gutter is shorter than the diameter of the bolt hole.

10. The housing of the surveillance camera according to claim 6, characterized in that: on the connection surface of top surface of the base and the upper cover, there is provided a seal retainer, and the bolt hole of the base is located at the outside of the seal retainer.

* * * * *